INVENTOR
BERNARD MAZELSKY

ATTORNEYS

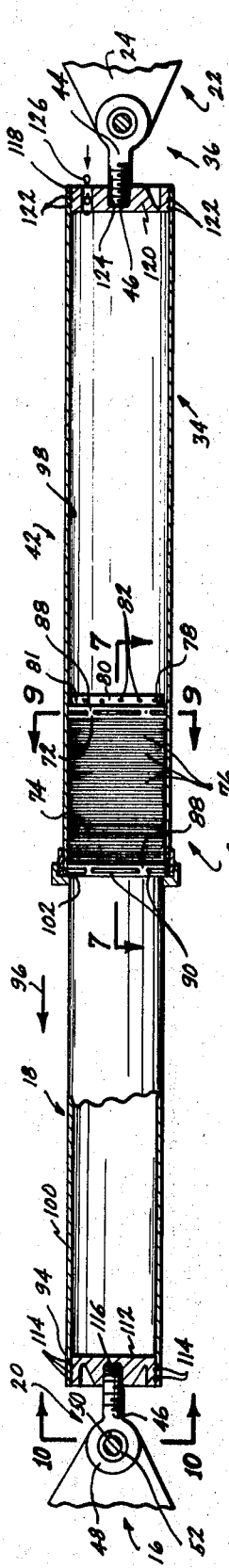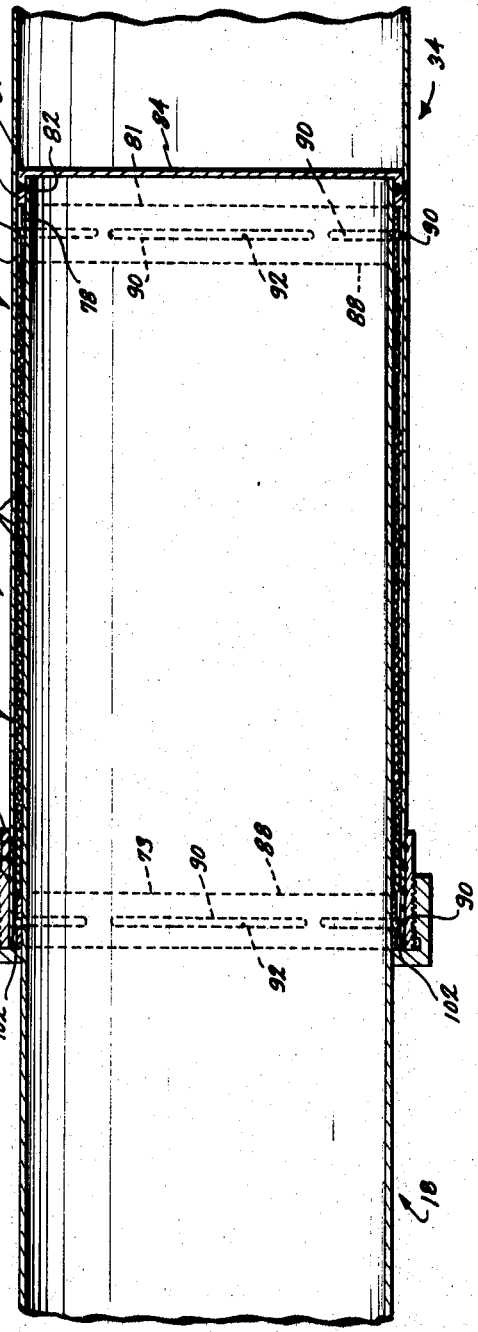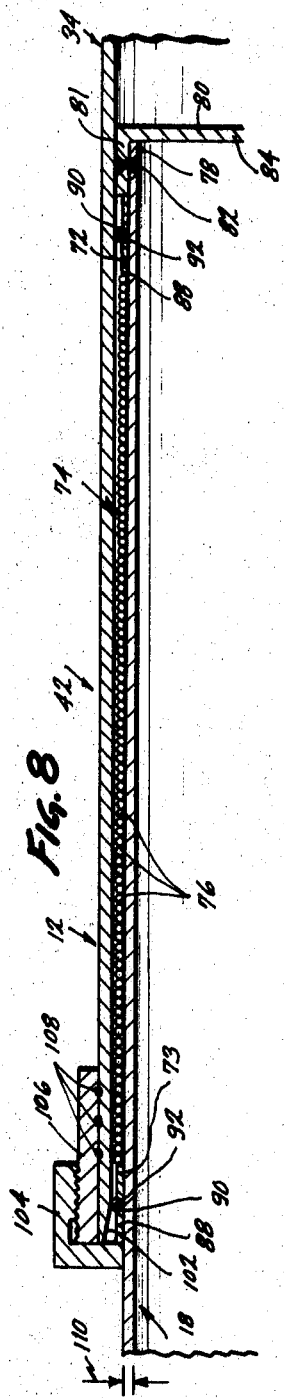

Sept. 15, 1970  B. MAZELSKY  3,528,529
ENERGY-ABSORBING, TELESCOPING TUBULAR MEMBERS
HAVING TORQUE TRANSMITTING CAPABILITY
Filed Jan. 22, 1968  4 Sheets-Sheet 3
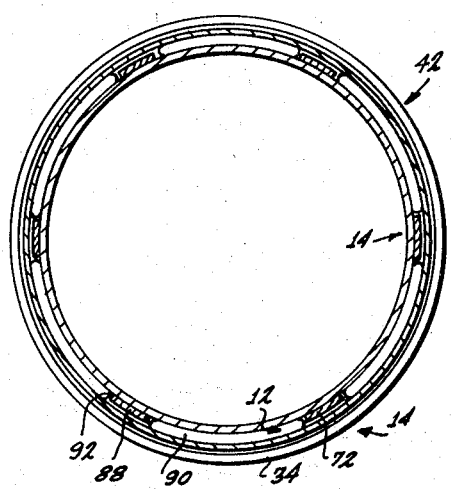
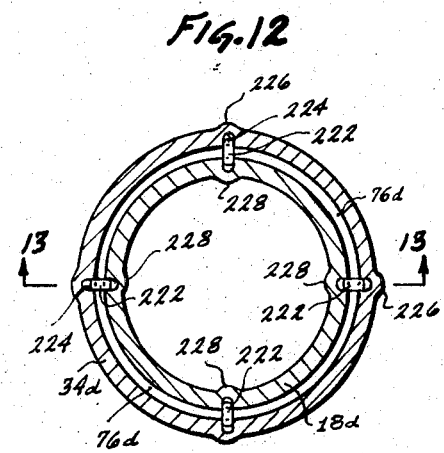
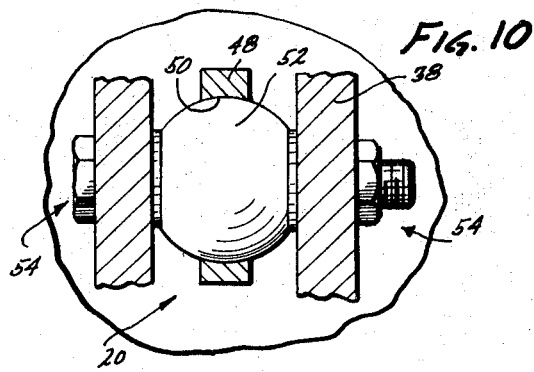
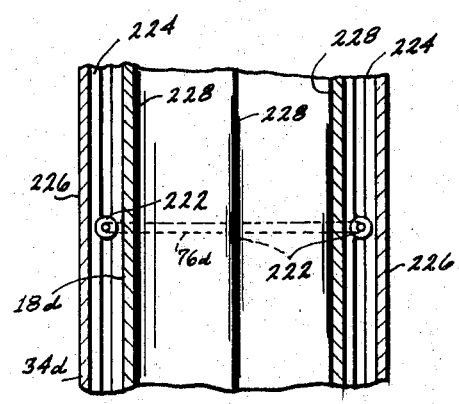
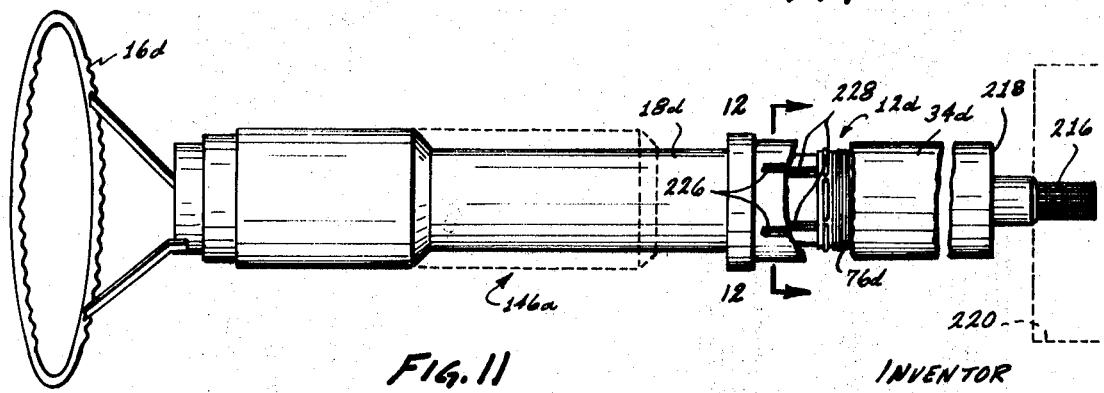
INVENTOR
BERNARD MAZELSKY
ATTORNEYS Sept. 15, 1970 B. MAZELSKY 3,528,529
ENERGY-ABSORBING, TELESCOPING TUBULAR MEMBERS
HAVING TORQUE TRANSMITTING CAPABILITY
Filed Jan. 22, 1968 4 Sheets-Sheet 4
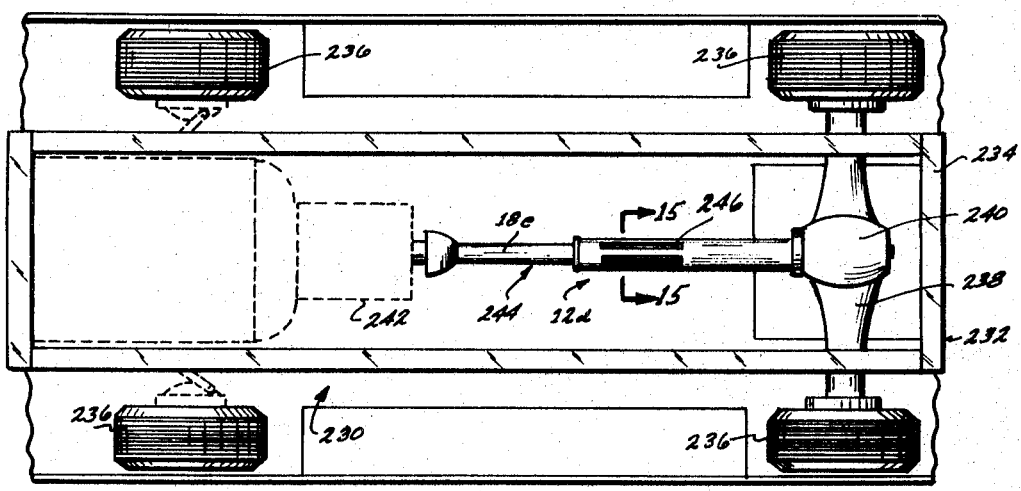
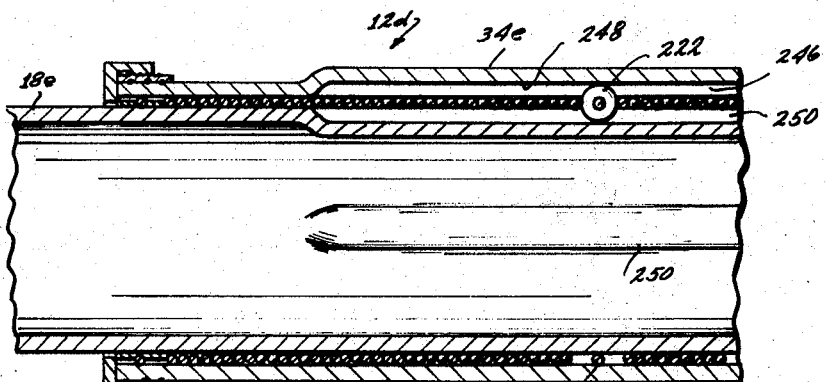
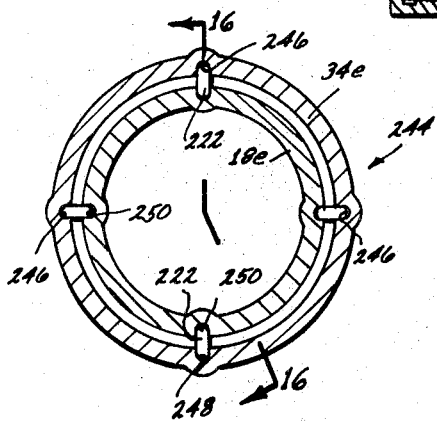
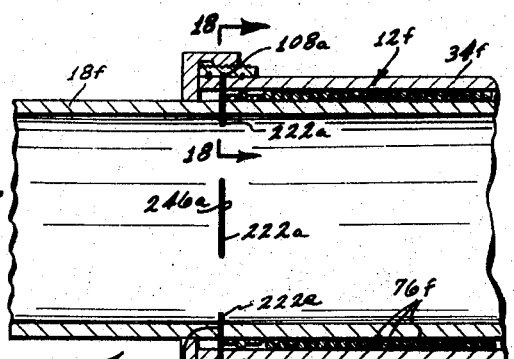
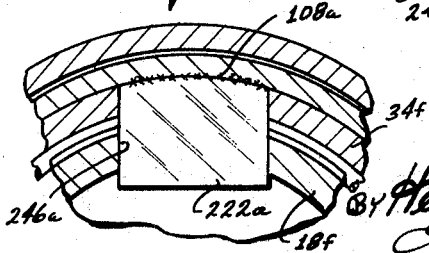
INVENTOR
BERNARD MAZELSKY
ATTORNEYS

United States Patent Office 3,528,529
Patented Sept. 15, 1970

3,528,529
ENERGY-ABSORBING, TELESCOPING TUBULAR MEMBERS HAVING TORQUE TRANSMITTING CAPABILITY
Bernard Mazelsky, West Covina, Calif., assignor to Ara, Inc., a corporation of California
Continuation-in-part of application Ser. No. 558,317, June 17, 1966. This application Jan. 22, 1968, Ser. No. 699,532
The portion of the term of the patent subsequent to Feb. 20, 1985, has been disclaimed
Int. Cl. F16f 7/12
U.S. Cl. 188—1                                        5 Claims

ABSTRACT OF THE DISCLOSURE

A first tubular member is telescopically engaged by a second tubular member having cycling and energy absorbing means operatively associated therewith for absorbing energy by deformation and reverse deformation in response to mechanical energy transmitted thereto by one of said members upon axial movement of at least one of said members with respect to the other. Keying means connect the members together in such a manner that they will transmit torque while remaining free to telescope with respect to each other.

CROSS-REFERENCE TO RELATED APPLICATION

This application is a continuation-in-part of a copending application filed June 17, 1966 under Ser. No. 558,317 for Energy Absorbing Device, now Pat. No. 3,369,634.

BACKGROUND OF THE INVENTION

The background of the invention is set forth in two parts.

Field of the invention

The present invention pertains generally to the field of non-destructive energy absorbing devices in combination with telescoping tubular members and more particularly to such a combination which includes an improved device of the type disclosed in Pat. No .3,231,049 wherein mechanical energy is absorbed by the cyclic plastic deformation of a solid material.

Description of the prior art

While generally satisfactory, energy absorbing devices of the type disclosed in said Pat. No. 3,231,049 have the limitation that rate of change of energy absorption remains substantially constant during the stroking distance of the absorber; that is, the attenuation force is constant with stroking distance.

SUMMARY OF THE INVENTION

In view of the foregoing, it is a primary object of the present invention to provide a new and useful energy-absorbing, telescoping member which has torque transmitting capability and which includes an energy absorbing device not subject to this limitation and including means for increasing the rate of change of energy absorption of the device by increasing or decreasing the attenuation during the stroking distance of the absorber.

Another object of the present invention is to provide a new and useful energy-absorbing, telescoping member including a linear-acting energy absorbing device of the type described which is especially designed for absorbing energy safely and efficiently without unduly limiting the torque transmitting capability of the telescoping member.

Yet another object of the present invention is to provide a new and useful telescoping member including an energy absorbing device of the type described which is not destroyed during an energy-absorbing cycle.

Another object of the present invention is to provide a telescoping member which includes an energy absorbing device wherein energy is absorbed by causing cyclic plastic tension deformation and compression deformation in an energy absorbing body.

According to the present invention, a torque-transmitting member includes first and second tubular members telescopically engaging each other in operative association with a cycling and energy absorbing means in the form of a solid body adapted to absorb energy by cyclic plastic tension deformation and compression deformation in response to mechanical energy transmitted thereto by at least one of said tubular members. Three embodiments are disclosed. Each embodiment includes means for increasing the rate of change of energy absorbed by the cycling energy absorbing means during the stroking distance of the device by having attenuation force increase or decrease with the stroking distance. Each embodiment also includes means telescopically connecting the members together in such a manner that they will have torque transmitting capability without loss of telescoping capability. One embodiment is shown for purposes of illustration, but not of limitation as comprising a steering column. The other two embodiments are shown as comprising drive shafts for motor vehicles.

As used herein, the term "mechanical energy" may be defined according to its conventional definition, i.e. a force acting through a distance. Also, as used in the present application, the term "cyclic plastic deformation" refers to the deformation of any solid material around a hysteresis curve, as illustrated in FIG. 21 of said Pat. No. 3,231,049. In addition, the terms "arcuate body," "toroidal body" and "helical body" shall include any body which may be operated upon to cause cyclic plastic tension deformation and compression deformation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWINGS

FIG. 6 is a longitudinal, cross-sectional view of a portion of an energy absorbing device which may be used in combination with telescoping tubular members of the present invention;

FIG. 7 is an enlarged, partial, cross-sectional view taken along line 7—7 of FIG. 6;

FIG. 8 is a view similar to FIG. 7 showing a portion thereof on a greatly enlarged scale to bring out certain details of construction;

FIG. 9 is an enlarged, cross-sectional view taken along line 9—9 of FIG. 6;

FIG. 10 is an enlarged, partial, cross-sectional view taken along line 10—10 of FIG. 6;

FIG. 11 is a plan view, with parts broken away to show internal construction, of a steering mechanism employing tubular members of the present invention;

FIG. 12 is an enlarged, cross-sectional view taken along line 12—12 of FIG. 11;

FIG. 13 is an enlarged, partial cross-sectional view taken along line 13—13 of FIG. 12;

FIG. 14 is a bottom plan view of an automobile employing a drive shaft constituting a second embodiment of the present invention;

FIG. 15 is an enlarged cross-sectional view taken along line 15—15 of FIG. 14;

FIG. 16 is a cross-sectional view taken along line 16—16 of FIG. 15;

FIG. 17 is a partial, cross-sectional view similar to FIG. 16 showing a drive shaft constituting a third embodiment of the present invention; and FIG. 18 is an enlarged cross-sectional view taken along line 18—18 of FIG. 17.

DESCRIPTION OF THE PREFERRED EMBODIMENT

Referring again to the drawings and particularly to FIGS. 1–4, during the impact of an automobile with a stationary object, it is well known that the automobile will provide some measure of attenuation due to its permanent deformation of the bumper, radiator, frame and the like, even though some mechanism of energy absorption is not included in the automobile. If an accelerometer is placed at the steering column-wheel junction, the acceleration measured during the impact will most probably experience a half sine wave type shape similar to that shown in FIG. 1. Although the exact shape of the input acceleration shown is difficult to describe exactly, two parameters appear to be common ot this class of input acceleration. These are the peak acceleration, $a_0$, and the duration time of the acceleration, $\Delta t$. From an analysis of numerous water and land impact tests, the half sine wave shape appears to represent the input acceleration curve due to crushing of the test body during impact. Assuming the crushing mechanism is similar for the automobile, a mathematical analysis of the requirements for the energy absorbing device or attenuator may be established when applied to the steering column.

Figure 1:
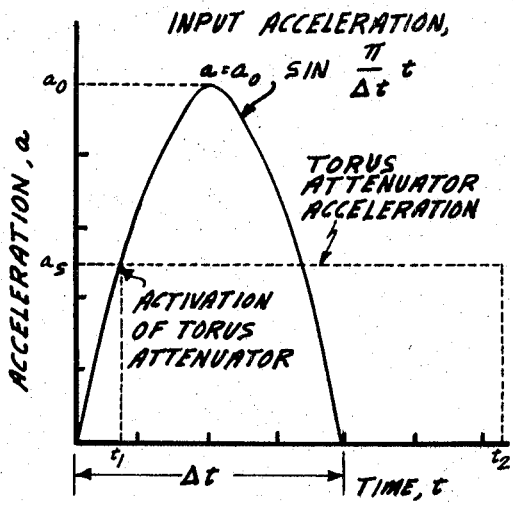
FIG. 1 is a graph showing acceleration plotted against time.

In FIG. 1, an energy absorbing device's acceleration curve is superimposed on the half sine wave for the purpose of illustrating the three additional parameters required to describe its mathematical characteristics. These are given as follows: At $t_1$, the device is activated at an acceleration level corresponding to $a_s$, which is experienced during the input acceleration of the crash, and operates at this level until the velocity of the device is zero, which occurs at time $t_2$.

Based on the acceleration characteristics shown in FIG. 1, a solution for the stroke requirements for the energy absorbing device may be developed as a function of three variables: the ratio of the device's acceleration to peak input acceleration, $a_s/a_0$; a non-dimensional acceleration ratio, $a_0 \pi \Delta^t/\pi V_0$ where $V_0$ corresponds to the initial impact velocity; and a non-dimensional stroke parameter, $$\bar{s} = \frac{s}{(V_0^2/2a_s)}$$

where $s$ is the stroke of the energy absorbing device. The non-dimensional stroke requirement, $\bar{s}$, for the device is plotted in FIG. 2 as a function of the other two parameters. Examination of the results of this figure indicate that, if benefits are to be derived from the attenuation caused by the crushing of the automobile, a value of $a_s/a_0$ equal to 0.5 or greater must be realized. In addition, if values of $a_0 \Delta t/\pi V_0$ are less than unity, the benefits of attenuation due to the crushing of the automobile may be difficult to realize unless the ratio $a_s/a_0$ is close to unity, which is extremely impractical. Since the engineering significance of the parameter $a_s/a_0$ is self-explanatory, the only two parameters that require some clarification are the input acceleration parameter, $a_0 \Delta t/\pi V_0$ and the stroke parameter $V_0^2/2a_s$. The first parameter, which consists of variables used to define the input acceleration curve shown in FIG. 1, may be evaluated in terms of the initial impact velocity, $V_0$, and the parameter involving the product of the peak "g" forces, $g_0$, and the distance $\Delta_s$, which is a measure of the input velocity $V_0$ times $\Delta t$, which describes the duration of the input acceleration. The characteristics of the acceleration parameter $a_0 \Delta t/\pi V_0$ are plotted in FIG. 3 as a function of the initial impact velocity, $V_0$, and the product parameter $g_0 \cdot \Delta_s$. Examination of the results of FIG. 3 indicate that for an impact velocity less than 20 ft. per second and for reasonable values of $g_0 \cdot \Delta_s$, values of the impact acceleration parameter $a_0 \Delta t/\pi V_0$ will be greater than one; however, for impact velocities from 40 to 100 feet per second, values of $g_0 \cdot \Delta_s$ greater than 100 must be attained or else the benefits derived from the reduction of stroke shown in FIG. 2 due to the input acceleration parameter $a_0 \Delta t/\pi V_0$ will not be realized. In more physical terms, if an input peak acceleration of 100 g's is experienced during a crash, then the total permanent deformation due to the automobile bumper, radiator, frame, guardrail and the like must exceed at least one foot and possibly five feet at high impact velocities. The results of FIG. 3 clearly indicate that for high velocity impact (in the range of 40 to 100 ft./sec.), then the attenuation of the driver through the steering column may be implemented by additional sources, such as an energy absorbing bumper or guard rail to minimize load levels and stroking distance.

Figure 2:
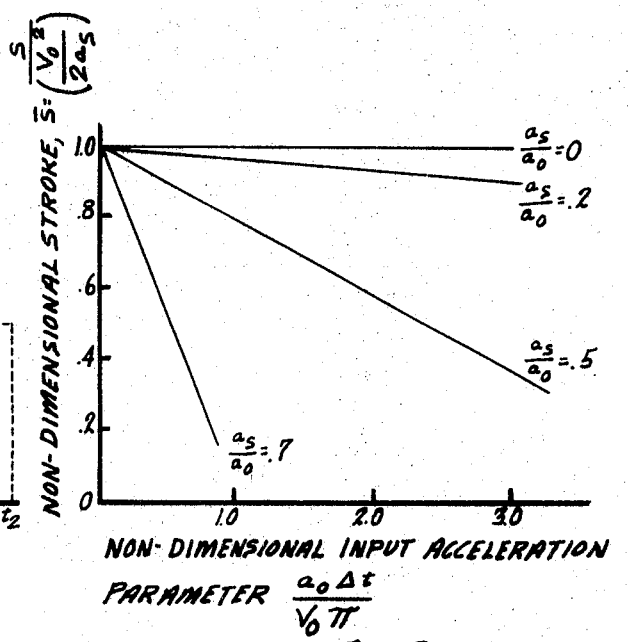
FIG. 2 is a graph showing non-dimensional stroke plotted against a non-dimensional input acceleration parameter.
Figure 3:
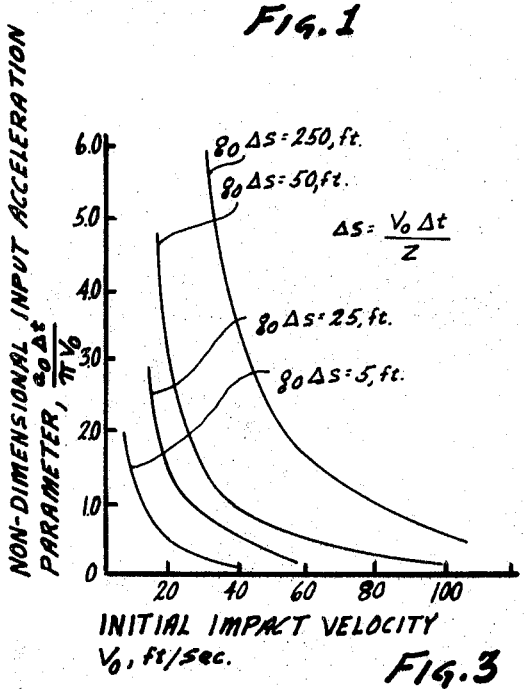
FIG. 3 is a graph showing a non-dimensional input acceleration parameter plotted against initial impact velocity.
Figure 4:
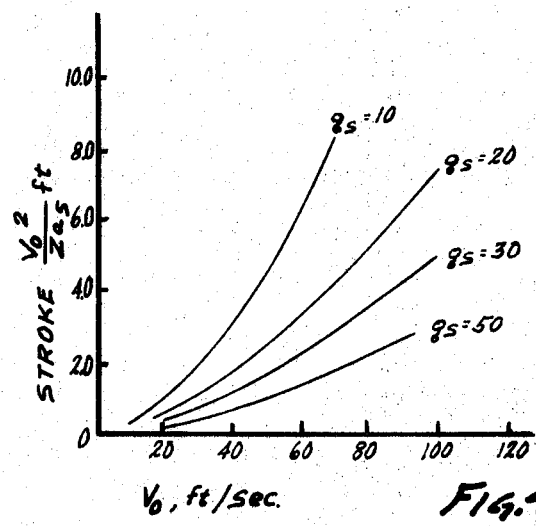
FIG. 4 is a graph showing stroke plotted against velocity.

In order to determine the actual stroke distance required for the steering column from the parameter, $\bar{s}$, shown in FIG. 2, a plot of the stroke parameter $V_0^2/2a_s$ is provided in FIG. 4 as a function of the impact velocity $V_0$ and several prescribed $g$ load levels of the torus attenuator located in the steering column. Once a value of the non-dimensional stroke distance $\bar{s}$ is determined from FIG. 2, the actual stroke distance required for the attenuator is obtained by multiplying $\bar{s}$ times the value of $V_0^2/2a_s$ obtained from FIG. 4, which is a function of the impact velocity $V_0$ and the operating $g$ force of the device, $g_s$.

Through proper automotive design and/or barrier design let it be assumed that a value of $\bar{s}=0.5$ can be obtained from FIG. 2. For an impact velocity of 80 feet per second, which corresponds to 54.5 miles per hour, and a $g$ level of the energy absorbing device or attenuator of 30, which according to established human tolerance criteria is acceptable without injury to the driver, (in the fore and aft direction), a stroke requirement of $3 \times .5 = 1.5$ feet is required for the steering column attenuator. If the value of $\bar{s}=0.5$ cannot be obtained by proper automotive and/or barrier design, then a value of $\bar{s}=0.9$ would be realized and consequently the steering column attenuator would require almost three feet of stroke for this same impact condition. It is quite clear that where 1.5 feet of stroke in the steering column is practical and values of 3 feet or greater are not practical, then the prevention of injury to a driver at relatively high speed, namely 80 feet per second or 54.5 miles per hour, is not feasible for any steering column attenuator system unless implemented by the attenuaiton available from other sources.

One such source of attenuation comprises the highway barrier shown at 10 in said copending application Ser. No. 558,317. This barrier included a cycling and energy absorbing means 12 and an energy transmitting means 14, as shown in FIGS. 5–10 herein.

The energy transmitting means 14 includes an impact receiving means 16, an inner tubular member 18, a first connector means 20 and a support means 22. The support means 22 includes a fixed support 24 and an outer tubular member 34, which maintains the cycling and energy absorbing means 12 in operative association with the inner tubular member 18 and maintains the alignment of the member 18 with the cycling and energy absorbing means 12. The support means 22 also includes a second connector means 36 for connecting the outer tubular member 34 to the support 24. The inner tubular member 18, the outer tubular member 34 and the cycling and energy absorbing means 12 form an attenuator assembly 42.

Each attenuator assembly 42 has a stroke of approximately 24 inches from its fully extended position to its fully compressed position where the inner tubular member 18 is substantially completely disposed within the outer tubular member 34. The attenuators 42 absorb energy in a manner to be hereinafter described by being stroked when impact receiving means 16 receives an impact from an automobile or the like. The energy absorbing capability of the attenuators 42 is such that the stroking of a particular attenuator will commence without substantial injury to a driver or passenger in the automobile.

Each connector means 36, 20 includes an eye bolt 44 having an externally threaded end 46 and a socket end 48. The socket end 48 includes a socket 50 in which a ball member 52 is articulately mounted for connection to an associated support 24 or an associated impact receving means 16, receptively, by a bolt and nut assembly 54 (FIG. 10). When the impact receiving means 16 is in its before-impact position, the attenuators 42 form an angle of approximately 45° with the impact receiving means 16. The articulated nature of the connector means 20, 36 and the before-impact position of the impact receiving means 16 assures that the stroke of the impact receiving means 16 will be approximately restricted only by the distance associated with the diameter of the attenuators 42 and not by their compressed length. In addition, this arrangement insures that the attenuators 42 and the connector means 20, 36 will remain intact regardless of the impact angle.

Figure 5:
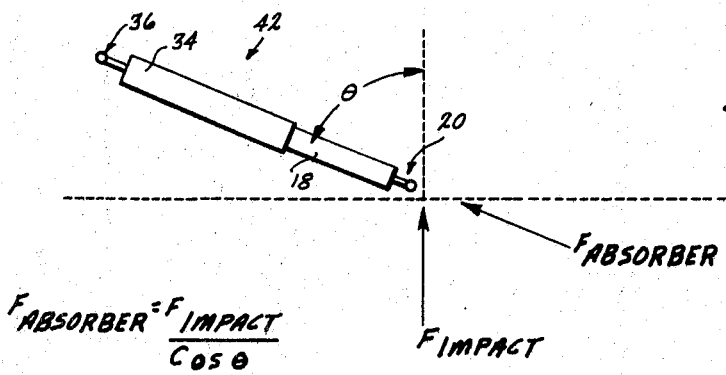
FIG. 5 is a force diagram showing somewhat schematically an energy absorbing device of the present invention when subjected to non-axial impacts.

Referring now more in particular to FIG. 5, if optimum energy absorption is to be obtained, F impact should be a constant during the stroking distance of the attenuator 42. For this condition, the force, F attenuator, must necessarily increase with stroke with the variation of $1/\cos\theta$ where $\theta$ would vary possibly from 45° to 75° during the stroke. This increasing force with stroke is manufactured into the attenuators 42 in a manner to be hereinafter described. Since the impact receiving means 16 is designed not to deform permanently during the excursion of the attenuators 42, and since the attenuators work in both the tension and compression strokes, every attenuator will be operative regardless of the impact force. Thus, the impact force is distributed over a maximum area of the impact receiving means 16 resulting in least likelihood of any one attenuator bottoming out.

The inside diameter of the outer tubular member 34 is sufficiently greater than the outside diameter of the inner tubular member 18 that an annular space or chamber 70 is provided therebetween. The cycling and energy absorbing means 12 is mounted in the chamber 70 in operative association with the outer tubular member 34 and the inner tubular member 18 for absorbing energy by cyclic plastic deformation and its reversed deformation in response to mechanical energy transmitted thereto by the energy transmitting means 14. The cycling and energy absorbing means 12 comprises a working cage 72, a stacking cage 73 and a solid, non-elastomeric, radially uncompressed, arcuate body in the form of a helical coil 74 having a plurality of turns 76. Each turn 76 constitutes an arcuate body adapted to be subjected to cyclic plastic tension deformation and compression deformation by the rotation of each turn 76 about its internal axis. The cycling and energy absorbing means 12 is prevented from moving past the end 78 of the tubular member 18 by a retainer cap 80 which includes a sidewall 81 encompassing the end 78, and secured thereto by suitable weldments 82, and a bottom wall 84 having a function to be hereinafter described. The sidewall 81 has an upper edge 86 engageable by the working cage 72 for preventing it from moving past the end 78.

The working cage 72 and the stacking cage 73 each includes a band 88 encompassing the inner tubular member 18 and a plurality of arcuate bodies 90 which are mounted in elongated openings 92 provided in an associated band 88.

The amount of energy absorbed by each attenuator 42 will depend, in part, upon the number of turns 76 which are rotated about their internal axes during a particular stroke. The number of turns 76 which are rotated depend upon whether or not they are brought into working engagement with the inner tubular member 18 and the outer tubular member 34 during a particular stroke. The turns 76 are programmed into working engagement with the inner tubular member 18 and the outer tubular member 34 during a particular stroke to produce the increasing force with stroke which is manufactured into each attenuator 42. This is accomplished by tapering the inner tubular member 18 a predetermined amount from its end 78 to its other end 94. Such a taper provides a varying chamber 70 resulting in the increasing force with stroke. The amount of taper depends on the inner tubular member 18, its diameter and the diameter of the turns 76, as will be more fully explained hereinafter.

During a particular stroke, the working cage 72, because of the rotation of the arcuate bodies 90 about their internal axes, not only absorbs energy, but also moves the turns 76 on the helical body 74 into working engagement with the outer tubular member 34 by sliding the turns 76 along the inner tubular member 18 in the direction of arrow 96. A predetermined number of turns 76 are initially in working engagement with the inner tubular member 18 and the outer tubular member 34 so that the cycling and energy absorbing means 12 will absorb a predetermined amount of energy upon initial impact. In order to be placed in working engagement with the inner tubular member 18 and the outer tubular member 34, the inner wall 98 of the outer tubular member 34 and the outer wall 100 of the inner tubular member 18 must exert sufficient frictional force on the turns 76 to rotate them about their internal axes. At the end of the stroke, the cycling and energy absorbing means 12 may be returned to the end 78 of the inner tubular member 18 by extending an associated attenuator 42. During this extension, the stacking cage 73 assures that the turns 76 will remain neatly stacked.

When a particular attenuator 42 is fully extended, the cycling and energy absorbing means 12 is prevented from leaving the open end 102 by a nut 104 which engages an externally threaded collar 106 secured to the end 102 of the tubular member 34 by suitable weldments 108.

Although a number of different parameters will manifest themselves for the various components of each attenuator 42, an illustrative set of values is as follows:

The inner tubular member 18 may comprise a 17–7PH, heat treated, stainless steel, hollow, cylindrical body having a 0.025 inch wall thickness, as indicated by arrows 110. in FIG. 8, an effective length of 12 inches and a 2.718 inch outside diameter at the end 94 tapering to a smaller diameter at the rate of 0.006 inch per foot in the direction of end 78.

The outer tubular member 34 may comprise a 17–7PH heat treated stainless steel, hollow cylindrical body having a 0.025 inch wall thickness and a 2.843 inch outside diameter.

The annular chamber 70 has a thickness of approximately 0.037 inch between the outer tubular member 34 and the inner tubular member 18 at the end 94 of the inner tubular member 18 with a corresponding increase in thickness at the rate of 0.006 inch per foot moving toward the end 78 to a maximum increase of 0.0015 inch.

The arcuate bodies 90 in the cages 72 and 73 are each made from a 302 stainless steel wire and are each approximately 0.0465 inch in diameter and 0.87 inch long. Six such bodies are provided in each of the cages 72, 73 and approximately 180 pounds of force are required to move each cage.

The helical coil 74 is made from a 302 stainless steel wire having approximately 0.045 inch diameter and includes approximately 80 turns, designated 76. It requires approximately 200 pounds of force to rotate each turn about its internal axis. Since the chamber 70 has a maximum change in thickness of 0.0015 inch and the arcuate bodies 90 have a 0.0015 inch greater diameter than the turns 76, the cages 72, 73 will always be in working engagement with the members 18 and 34. This assures that the cages 72, 73 will always push the turns 76 during stroking of the attenuators 42.

The connector means 20 is secured to the end 94 of an associated attenuator 42 by a plug 112 which is secured in the open end 94 of the inner tubular member 18 by suitable weldments 114 and which includes an internally threaded counterbore 116 threadedly receiving the threaded end 46 of eye bolt 44.

The connector means 36 is secured to the end 118 of the outer tubular member 34 by an end cap 120 which is secured in the open end 118 by suitable weldments 122 and which includes an internally threaded counterbore 124 threadedly receiving the externally threaded end 46 of eye bolt 44. An air inlet valve 126 is mounted in the end cap 120 for introducing compressed air into the interior of the outer tubular member 34 for exerting a force against the closed bottom wall 84 of the end cap 80 for the purpose of extending the attenuator 42 after it has been compressed.

A first embodiment of an energy-absorbing, telescoping tubular member having torque transmitting capability will now be described in connection with FIGS. 11–13 wherein a steering mechanism 146a includes an impact receiving means 16d in the form of a steering wheel which may be non-rotatably connected to an internal tubular member 18d which is telescopically received in an outer tubular member 34d having a splined shaft 216 affixed to the end 218 thereof. The splined shaft 216 is operatively associated with the customary steering gears (not shown) which may be housed in a housing represented by the broken lines 220.

The steering mechanism 146a also includes a cycling and energy absorbing means 12d which may be identical to the cycling and energy absorbing means 12 previously described except that a predetermined number of turns 76d may be provided with spherical elements 222 disposed within fluted chambers 224 for non-rotatably connecting the inner tubular member 18d to the outer tubular member 34d while permitting relative reciprocation between the two members. The fluted chambers 224 may be formed by axially-extending, arcuate channels 226 formed in the outer tubular member 34d, and matching channels 228 formed in the inner tubular member 18d.

A second embodiment of an energy-absorbing telescoping tubular member having torque transmitting capability will now be described in connection with FIGS. 14–16 wherein an automobile 230 includes a chassis 232 having a frame 234, wheels 236, a rear axle housing 238, a differential 240 and a transmission 242. A drive shaft assembly 244 connects transmission 242 to differential 240 and includes an inner tubular member 18e which is telescopically received in an outer tubular member 34e.

The drive shaft 244 also includes a cycling and energy absorbing means 12d which may be identical to the cycling and energy absorbing means previously described in connection with FIGS. 11–13. The cycling and energy absorbing means 12d includes at least one turn 76d which is provided with spherical elements 222 disposed within fluted chambers 246 for non-rotatably connecting the inner tubular member 18e to the outer tubular member 34e while permitting relative axial movement or reciprocation between the two members. The fluted chambers 246 may be formed by axially-extending arcuate channels 248 formed in the outer tubular member 34e and matching channels 250 formed in the inner tubular member 18e.

Referring now to FIGS. 17 and 18, a drive shaft 244a may be identical to the drive shaft 244 except that spherical element 222 and fluted chambers 246 may be replaced by a plurality of shearable members 222a and peripheral slots 246a, respectively.

Drive shaft 244a includes a cycling and energy absorbing means 12f which may be identical to the cycling and energy absorbing means 12d, except that the spherical elements 222 are eliminated leaving turns 76f similar to those described in connection with FIGS. 7–8.

The shearable members 222a non-rotatably connect an inner tubular member 18f to an outer tubular member 34f while readily shearing to permit relative axial movement or reciprocation between the two members. Each shearable member 222a may be held in position within its associated slot 246a by a weldment 108a which also secures an externally threaded member 106a to outer tubular member 34f. Four shearable members 222a may be employed and each member may be made from 2 inch x 0.002 inch shim stock of brass or the like. The 2 inch dimension is positioned radially so that each member 222a will not shear under normal torque loads encountered during rotation of drive shaft 244a. The 0.002 inch dimension permits shearing without unduly increasing the attenuation force when drive shaft 244a is subjected to axial loading of sufficient magnitude to cycle the cycling and energy absorbing means 12f.

What is claimed is:
1. An energy-absorbing, telescoping member having torque transmitting capability, comprising:
   an inner member telescopically engaged in an outer member with sufficient clearance to form an annular chamber between said members;
   cycling and energy absorbing means mounted in said chamber for absorbing energy transmitted to said cycling and energy absorbing means by relative axial movement of said members, said cycling and energy absorbing means including means for absorbing energy by a plastic deformation and a reversed plastic deformation of the same portions thereof in response to mechanical energy transmitted thereto by said members; and
   means within said chamber connecting said members together for preventing relative rotation between said members without substantially impeding relative axial movement between said members.

2. An energy-absorbing member as stated in claim 1 wherein one of said members comprises an upper steering column means and the other of said members comprises a lower steering column means in a steerable vehicle.

3. An energy-absorbing member as stated in claim 1 wherein one of said members is connected to an automobile transmission and the other of said members is connected to an automobile differential.

4. An energy-absorbing member as stated in claim 1 wherein said connecting means comprises at least one axially extending groove facing said chamber on each member and a substantially spherical member disposed in said grooves.

5. An energy-absorbing member as stated in claim 1 wherein said connecting means comprises at least one shearable member connecting said inner member to said outer member.

References Cited

UNITED STATES PATENTS 3,059,727 10/1962 Fuchs.
3,369,634 2/1968 Mazelsky.

DUANE A. REGER, Primary Examiner

U.S. Cl. X.R.

74—492